United States Patent
Pham

(10) Patent No.: US 11,025,614 B2
(45) Date of Patent: Jun. 1, 2021

(54) SYSTEMS, METHODS, AND MEDIA FOR MANAGING USER CREDENTIALS

(71) Applicant: Thien Van Pham, Lacey, WA (US)

(72) Inventor: Thien Van Pham, Lacey, WA (US)

(73) Assignees: Synergex Group, Greenwich, CT (US); Pham Holdings Inc., Lacey, WA (US); Wayne Taylor, Chandler, AZ (US)

( * ) Notice: Subject to any disclaimer, the term of this patent is extended or adjusted under 35 U.S.C. 154(b) by 185 days.

(21) Appl. No.: 16/163,416

(22) Filed: Oct. 17, 2018

(65) Prior Publication Data
US 2020/0127992 A1    Apr. 23, 2020

(51) Int. Cl.
  *H04L 29/06* (2006.01)
  *H04L 9/32* (2006.01)
  *G06F 21/45* (2013.01)
  *H04L 9/08* (2006.01)
  (Continued)

(52) U.S. Cl.
  CPC ............ H04L 63/083 (2013.01); G06F 21/32 (2013.01); G06F 21/45 (2013.01); H04L 9/0825 (2013.01); H04L 9/0863 (2013.01); H04L 9/3226 (2013.01)

(58) Field of Classification Search
  CPC .......... G06F 21/32; G06F 21/41; G06F 21/42; G06F 21/45; H04L 63/0442; H04L 63/083; H04L 63/0861; H04L 63/0815; H04L 9/006; H04L 9/0825; H04L 9/0863;
  (Continued)

(56) References Cited

U.S. PATENT DOCUMENTS 5,586,260 A * 12/1996 Hu .................. G06F 21/33
                                                704/272
5,790,668 A *  8/1998 Tomko .............. G07C 9/257
                                                713/186
(Continued)

FOREIGN PATENT DOCUMENTS

CN       101682625       3/2010
EP         2355401       8/2011
(Continued)

OTHER PUBLICATIONS ip.com. "Method and Apparatus to Seemless Sign on based on Client Vault", Dec. 20, 2005. (Year: 2005).*
(Continued)

*Primary Examiner* — Michael Simitoski
(74) *Attorney, Agent, or Firm* — Byrne Poh LLP

(57) ABSTRACT

Receiving a first username of a first user account (FAU) and a biometric signature (BS) of a user; in response to determining that BS matches a stored signature of FAU, presenting indications of a group of available services (GAS); receiving a selection of a service of GAS; transmitting an identifier of the selected service (SS); receiving an encrypted username (EU) and an encrypted password (EP) of a second user account (SAU) of SS; decrypting EU and EP; opening a first page that corresponds to a login page (LP) of SS; launching a script that identifies a username entry field (UEF) and a password entry field (PEF) on LP; entering the decrypted username (DU) in UEF and the decrypted password (DP) in PEF; and selecting a submit button (SB) within LP, wherein selecting SB to be selected causes SAU to be authenticated using DU and DP.

12 Claims, 14 Drawing Sheets

(51) Int. Cl.
*G06F 21/32* (2013.01)
*G06F 21/62* (2013.01)

(58) Field of Classification Search
CPC ... H04L 9/0891; H04L 9/3226; H04L 9/3231; H04L 29/06768
See application file for complete search history.

(56) References Cited

U.S. PATENT DOCUMENTS

| | | | |
|---|---|---|---|
| 6,072,876 A * | 6/2000 | Obata | H04L 9/302 380/282 |
| 7,404,204 B2 * | 7/2008 | Davenport | G06F 21/41 726/8 |
| 7,415,571 B1 | 8/2008 | Hanan | |
| 8,429,422 B1 * | 4/2013 | Hagan | H04L 67/02 713/190 |
| 8,776,214 B1 * | 7/2014 | Johansson | H04L 63/102 726/18 |
| 10,356,088 B1 * | 7/2019 | Peddada | G06F 21/31 |
| 2001/0010044 A1 * | 7/2001 | Aieta | H04L 63/126 705/50 |
| 2002/0055909 A1 * | 5/2002 | Fung | G07F 7/00 705/42 |
| 2002/0078386 A1 * | 6/2002 | Bones | G06F 21/41 726/8 |
| 2002/0095588 A1 * | 7/2002 | Shigematsu | G06Q 20/367 713/186 |
| 2003/0065941 A1 | 4/2003 | Ballard et al. | |
| 2003/0138135 A1 * | 7/2003 | Chung | G06K 7/10346 382/119 |
| 2004/0230536 A1 * | 11/2004 | Fung | G06Q 40/00 705/64 |
| 2005/0055316 A1 * | 3/2005 | Williams | G06Q 20/40 705/65 |
| 2005/0210267 A1 * | 9/2005 | Sugano | H04W 12/0609 713/186 |
| 2005/0257057 A1 | 11/2005 | Ivanov et al. | |
| 2006/0200660 A1 | 9/2006 | Woods | |
| 2006/0265740 A1 * | 11/2006 | Clark | G06F 21/34 726/8 |
| 2007/0157298 A1 * | 7/2007 | Dingwall | G06F 21/41 726/8 |
| 2007/0169174 A1 * | 7/2007 | Critten | G06F 21/34 726/3 |
| 2007/0299915 A1 | 12/2007 | Shraim et al. | |
| 2008/0028464 A1 | 1/2008 | Bringle et al. | |
| 2008/0031447 A1 * | 2/2008 | Geshwind | H04L 9/3226 380/46 |
| 2008/0077982 A1 * | 3/2008 | Hayler | H04L 63/083 726/12 |
| 2008/0240440 A1 | 10/2008 | Rose et al. | |
| 2009/0034706 A1 | 2/2009 | Leigh et al. | |
| 2009/0158412 A1 * | 6/2009 | Miller | G06F 21/41 726/8 |
| 2009/0172795 A1 * | 7/2009 | Ritari | H04L 63/0815 726/7 |
| 2009/0228978 A1 * | 9/2009 | Cooley | G06F 21/31 726/19 |
| 2010/0037046 A1 * | 2/2010 | Ferg | H04L 9/321 713/155 |
| 2010/0174791 A1 | 7/2010 | Tian et al. | |
| 2010/0195824 A1 | 8/2010 | Lin et al. | |
| 2010/0199086 A1 * | 8/2010 | Kuang | H04L 63/0869 713/155 |
| 2011/0205965 A1 | 8/2011 | Sprigg et al. | |
| 2011/0246213 A1 * | 10/2011 | Yarvis | G06Q 30/00 705/1.1 |
| 2012/0087493 A1 * | 4/2012 | Chidambaram | H04L 9/32 380/44 |
| 2012/0269348 A1 * | 10/2012 | Rong | H04L 9/32 380/278 |
| 2013/0010731 A1 | 1/2013 | Diener et al. | |
| 2013/0103807 A1 | 4/2013 | Couto et al. | |
| 2013/0198288 A1 | 8/2013 | Jones et al. | |
| 2013/0254856 A1 * | 9/2013 | Krishan | H04L 63/083 726/6 |
| 2014/0189808 A1 * | 7/2014 | Mahaffey | H04L 63/0853 726/4 |
| 2014/0219447 A1 | 8/2014 | Park et al. | |
| 2014/0281945 A1 * | 9/2014 | Avni | G06T 1/0028 715/268 |
| 2014/0325623 A1 * | 10/2014 | Johansson | H04L 63/0823 726/6 |
| 2015/0096000 A1 | 4/2015 | Sharif et al. | |
| 2015/0134956 A1 * | 5/2015 | Stachura | H04L 63/0807 713/168 |
| 2016/0055328 A1 * | 2/2016 | Shen | H04L 9/0866 713/168 |
| 2016/0154982 A1 | 6/2016 | Velusamy et al. | |
| 2016/0373445 A1 | 12/2016 | Hayton et al. | |
| 2017/0046532 A1 * | 2/2017 | Miller | H04L 9/0825 |
| 2017/0142076 A1 * | 5/2017 | Ford | G06F 21/10 |
| 2017/0180118 A1 | 6/2017 | Bernheim et al. | |
| 2017/0188231 A1 | 6/2017 | Nix | |
| 2017/0279602 A1 | 9/2017 | Pham | |
| 2017/0279608 A1 | 9/2017 | Pham | |
| 2018/0026968 A1 * | 1/2018 | Canavor | H04L 63/0823 726/6 |
| 2018/0332034 A1 | 11/2018 | Pham | |
| 2018/0367506 A1 * | 12/2018 | Ford | H04W 12/02 |
| 2020/0004946 A1 * | 1/2020 | Gilpin | H04L 63/10 |
| 2020/0004983 A1 * | 1/2020 | Chen | H04L 63/0428 |
| 2020/0351403 A1 | 11/2020 | George et al. | |

FOREIGN PATENT DOCUMENTS

| | | |
|---|---|---|
| TW | 201541923 | 11/2015 |
| WO | WO 2002/021793 | 3/2002 |
| WO | WO 2015/133482 | 9/2015 |

OTHER PUBLICATIONS

R. Malutan and C. Grosan, "Web authentication methods using single sign on method and virtual keyboard," 2015 Conference Grid, Cloud & High Performance Computing in Science (ROLCG), Cluj-Napoca, 2015, pp. 1-4, doi: 10.1109/rolcg.2015.7367431. (Year: 2015).*
J. Milburn and H. Lee, "FassKey: A secure and convenient authentication system,"2016 IEEE NetSoft Conference and Workshops (NetSoft), Seoul, 2016, pp. 489-495, doi: 10.1109/netsoft.2016.7502490. (Year: 2016).*
Office Action dated Apr. 2, 2021 in U.S. Appl. No. 17/015,996, pp. 2-7.
International Preliminary Report on Patentability dated Oct. 4, 2018 in International Application No. PCT/US2017/024084, pp. 1-9.
International Search Report and Written Opinion dated Jan. 14, 2020 in International Patent Application No. PCT/US2019/056304, pp. 1-17.
International Search Report and Written Opinion dated Jun. 22, 2017 in International Patent Application No. PCT/US2017/024084, pp. 1-11.
Notice of Allowance dated May 1, 2019 in U.S. Appl. No. 15/469,119, pp. 1-22.
Notice of Allowance dated Jul. 31, 2018 in U.S. Appl. No. 15/081,447, pp. 1-36.
Notice of Allowance dated Sep. 19, 2018 in U.S. Appl. No. 15/081,447, pp. 1-33.
Office Action dated May 27, 2020 in KR Patent Application No. 10-2018-7030030, pp. 1-6.
Office Action dated Jun. 2, 2020 in TW Patent Application No. 106110160, pp. 1-27.
Office Action dated Jun. 18, 2020 in U.S. Appl. No. 16/530,445, pp. 2-9.
Office Action dated Oct. 5, 2018 in U.S. Appl. No. 15/469,119, pp. 2-27.

(56) References Cited

OTHER PUBLICATIONS

Office Action dated Dec. 8, 2020 in U.S. Appl. No. 16/530,445, pp. 2-12.
Office Action dated Dec. 28, 2020 in U.S. Appl. No. 17/015,996, pp. 2-6.
Supplemental European Search Report dated Oct. 18, 2019 in EP Patent Application No. 17771261.9, pp. 1-8.

* cited by examiner

SYSTEMS, METHODS, AND MEDIA FOR MANAGING USER CREDENTIALS

TECHNICAL FIELD

The disclosed subject matter relates to systems, methods, and media for managing user credentials.

BACKGROUND

Users frequently have different usernames and passwords for many different applications or user accounts. For example, a user might have a first username and password for an email account and a different username and password for an online banking account. It can be difficult to remember many different usernames and passwords. To remember different usernames and passwords, users often write down usernames and passwords, either on paper or in a digital file. However, this can create a security risk, for example, for the information to be stolen and maliciously used.

Accordingly, it is desirable to provide new systems, methods, and media for managing user credentials.

SUMMARY

Systems, methods, and media for managing user credentials are provided.

In some embodiments, systems for managing user credentials are provided, the systems comprising: at least one hardware processor configured to: receive a first username corresponding to a first user account of an application for managing user credentials and a biometric signature of a user; in response to determining that the biometric signature of the user matches a stored signature corresponding to the first user account, cause indications of a group of available services to be presented; receive a selection of a service of the group of available services; transmit, to a server, an identifier corresponding to the selected service; receive, from the server, an encrypted username and an encrypted password corresponding to a second user account of the selected service; decrypt the encrypted username and the encrypted password; cause a first page to be opened that corresponds to a login page of the selected service; cause a script to be launched, wherein the script identifies a username entry field and a password entry field on the login page; cause, using the script, the decrypted username to be entered in the username entry field and the decrypted password to be entered in the password entry field; and cause, using the script, a submit button within the login page to be selected, wherein causing the submit button to be selected causes the second user account to be authenticated using the decrypted username and the decrypted password.

In some embodiments, methods for managing user credentials are provided, the methods comprising: receiving, at a user device, a first username corresponding to a first user account of an application for managing user credentials and a biometric signature of a user of the user device; in response to determining that the biometric signature of the user matches a stored signature corresponding to the first user account, causing indications of a group of available services to be presented on the user device; receiving, at the user device, a selection of a service of the group of available services; transmitting, to a server, an identifier corresponding to the selected service; receiving, from the server, an encrypted username and an encrypted password corresponding to a second user account of the selected service; decrypting the encrypted username and the encrypted password; causing, on the user device, a first page to be opened that corresponds to a login page of the selected service; causing, at the user device, a script to be launched, wherein the script identifies a username entry field and a password entry field on the login page; causing, at the user device by the script, the decrypted username to be entered in the username entry field and the decrypted password to be entered in the password entry field; and causing, using the script, a submit button within the login page to be selected, wherein causing the submit button to be selected causes the second user account to be authenticated using the decrypted username and the decrypted password.

In some embodiments, non-transitory computer-readable media containing computer executable instructions that, when executed by a processor, cause the processor to perform a method for managing user credentials are provided, the method comprising: receiving, at a user device, a first username corresponding to a first user account of an application for managing user credentials and a biometric signature of a user of the user device; in response to determining that the biometric signature of the user matches a stored signature corresponding to the first user account, causing indications of a group of available services to be presented on the user device; receiving, at the user device, a selection of a service of the group of available services; transmitting, to a server, an identifier corresponding to the selected service; receiving, from the server, an encrypted username and an encrypted password corresponding to a second user account of the selected service; decrypting the encrypted username and the encrypted password; causing, on the user device, a first page to be opened that corresponds to a login page of the selected service; causing, at the user device, a script to be launched, wherein the script identifies a username entry field and a password entry field on the login page; causing, at the user device by the script, the decrypted username to be entered in the username entry field and the decrypted password to be entered in the password entry field; and causing, using the script, a submit button within the login page to be selected, wherein causing the submit button to be selected causes the second user account to be authenticated using the decrypted username and the decrypted password.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for managing user credentials are provided.

In some embodiments, the mechanisms described herein can store user credentials for accessing multiple user accounts of a user for different websites, apps, or services. For example, in some embodiments, the mechanisms can store user credentials (e.g., a username and/or a password) for user accounts for accessing an email account, accessing a social networking account, accessing a bank account, and/or any other suitable websites, apps, or services. Additionally or alternatively, in some embodiments, the mechanisms described herein can be used to change a password associated with a particular user account to a randomly generated password, update the password associated with the user account, and store the new password.

In some embodiments, the mechanisms described herein can be implemented as an application that can be used by a user to securely access multiple user accounts. For example, in some embodiments, the user can log-in to the application, and, after successfully logging-in, can select a particular website, app, or service (e.g., a particular email service, a particular social networking service, a particular banking service, and/or any other suitable website or service) for which the user has stored user credentials to access. In some embodiments, after selecting a particular website, app, or service for which the user has previously stored user credentials, the mechanisms can retrieve a username and password associated with the selected website, app, or service, and can cause the retrieved username and password to automatically be entered into user login text boxes associated with the selected website, app, or service, as described below in more detail in connection with FIG. 10.

In some embodiments, the user can log-in to the application to access different websites, apps, or services in any suitable manner. For example, in some embodiments, the user can enter a username corresponding to the application and can submit a user signature for validation (e.g., entered via a touchscreen, and/or in any other suitable manner). In some such embodiments, the mechanisms can verify the validity of the signature, and can allow the user access to the application in response to validating the signature.

Figure 8:
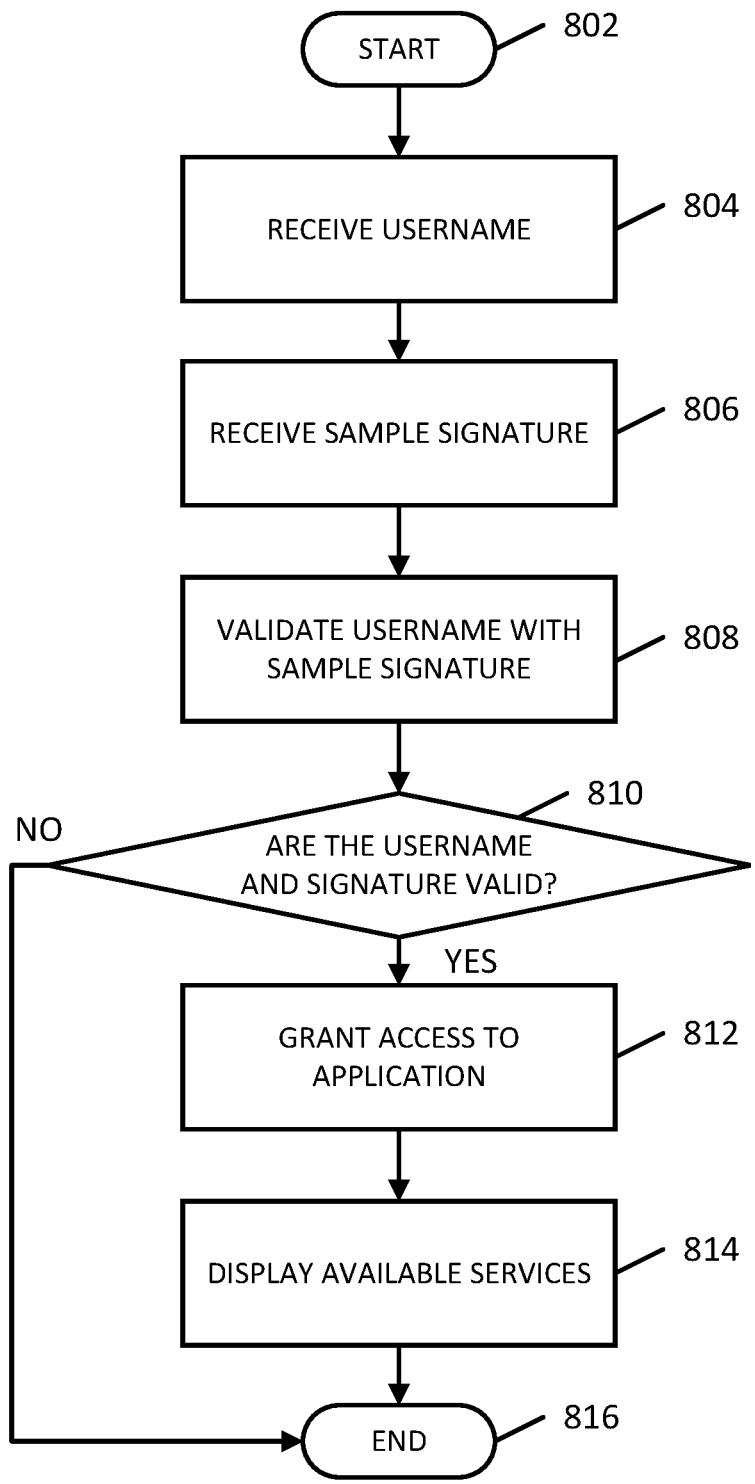
FIG. 8 shows an example of a process for signing-in to an account using a biometric signature in accordance with some embodiments of the disclosed subject matter.

Turning to FIG. 8, an example 800 of a process for using a signature to log-in to an application is shown in accordance with some embodiments of the disclosed subject matter.

Figure 1:
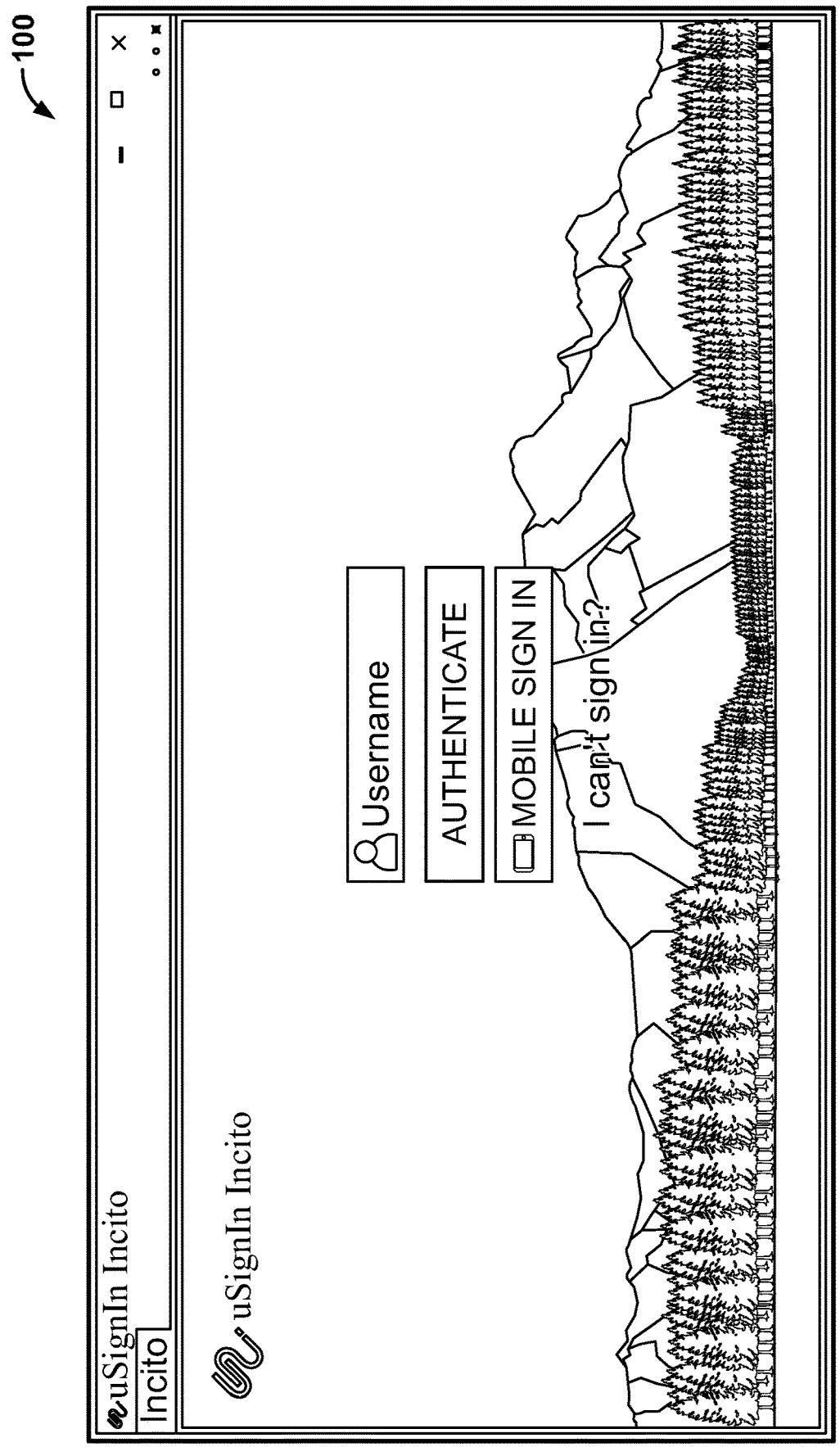
FIG. 1 shows an example of a user interface for logging-in to a user account in accordance with some embodiments of the disclosed subject matter.

Process 800 can begin at 802 and can proceed to 804. At 804, process 800 can receive a username associated with an application for accessing available services, apps, or websites that require authentication. In some embodiments, the username can be received in any suitable manner. For example, in some embodiments, the username can be entered via a user interface, such as user interface 100 shown in FIG. 1. In some such embodiments, user interface 100 can be presented in any suitable manner. For example, in some embodiments, user interface 100 can be presented as part pf an application for accessing available services, websites, and/or apps being selected (e.g., on a mobile device, on a desktop computer, and/or on any other suitable device).

At 806, process 800 can receive a biometric signature of a user. In some embodiments, the biometric signature can be received in any suitable manner. For example, in some embodiments, the biometric signature can be received via a gesture on a touchscreen associated with a device that presented user interface 100. In some embodiments, the biometric signature can include any suitable information. For example, in some embodiments, the biometric signature can be a fingerprint of the user. As another example, in some embodiments, the biometric signature can be a handwritten gesture of the user.

Figure 13:
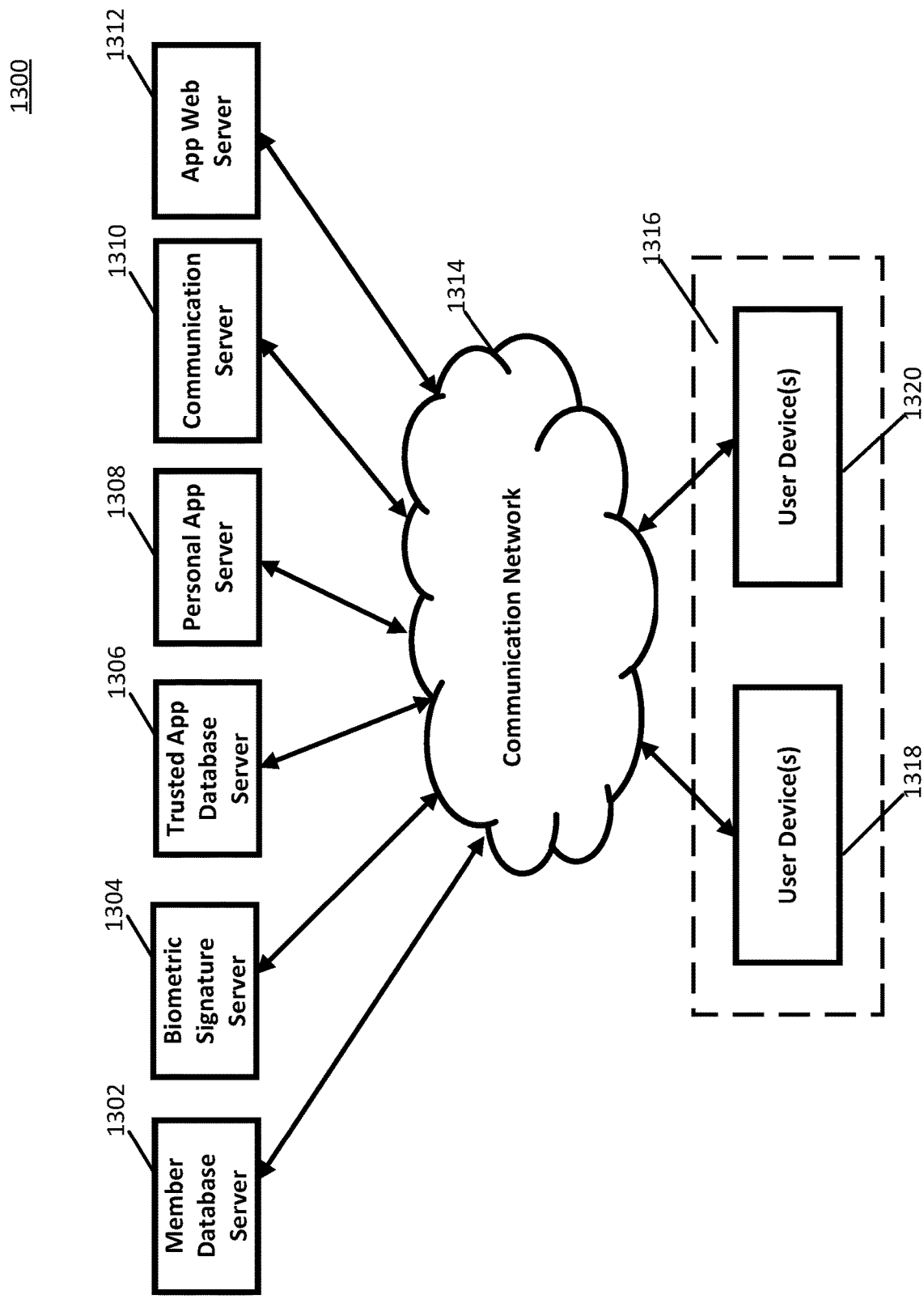
FIG. 13 shows a schematic diagram of an illustrative system suitable for managing user credentials in accordance with some embodiments of the disclosed subject matter.

At 808, process 800 can validate the username with the signature. In some embodiments, process 800 can validate the username and the biometric signature using any suitable technique or combination of techniques. For example, in some embodiments, process 800 can transmit the username and the signature to an application web server 1312 as shown in FIG. 13. In some embodiments, application web server 1312 can verify that the username exists using a member database server 1302, as shown in FIG. 13. If the username exists, application web server 1312 can determine a unique identifier associated with the username, and can transmit a query that includes the unique identifier and the biometric signature to a biometric signature server 1304, as shown in FIG. 13. In some embodiments, application web server 1312 can then receive a response from biometric signature server 1304 that indicates whether the username and biometric signature are valid. For example, in some embodiments, biometric signature server 1304 can determine whether the biometric signature matches a biometric signature previously submitted by the user using any suitable technique(s).

At 810, process 800 can determine if the username and biometric signature are valid. For example, in some embodiments, process 800 can determine whether the username and signature are valid based on a response from biometric signature server 1304, as described above. As a more particular example, in some embodiments, process 800 can determine that the username and signature are valid in response to receiving a response indicating that the biometric signature matches a biometric signature previously submitted by a user associated with the username. As another more particular example, in some embodiments, process 800 can determine that the username and signature are not valid in response to receiving a response indicating that the biometric signature does not match a biometric signature previously submitted by a user associated with the username.

If, at 810, process 800 determines that the username and the biometric signature are not valid ("no" at 810), process 800 can end at 816.

If, at 810, process 800 determines that the username and the signature are valid ("yes" at 810), process 800 can allow the user access to an application for available services or websites at 812. For example, in some embodiments, process 800 can display a home page associated with the application.

At 814, process 800 can display a user interface that indicates available websites, apps, and/or services.

Figure 4:
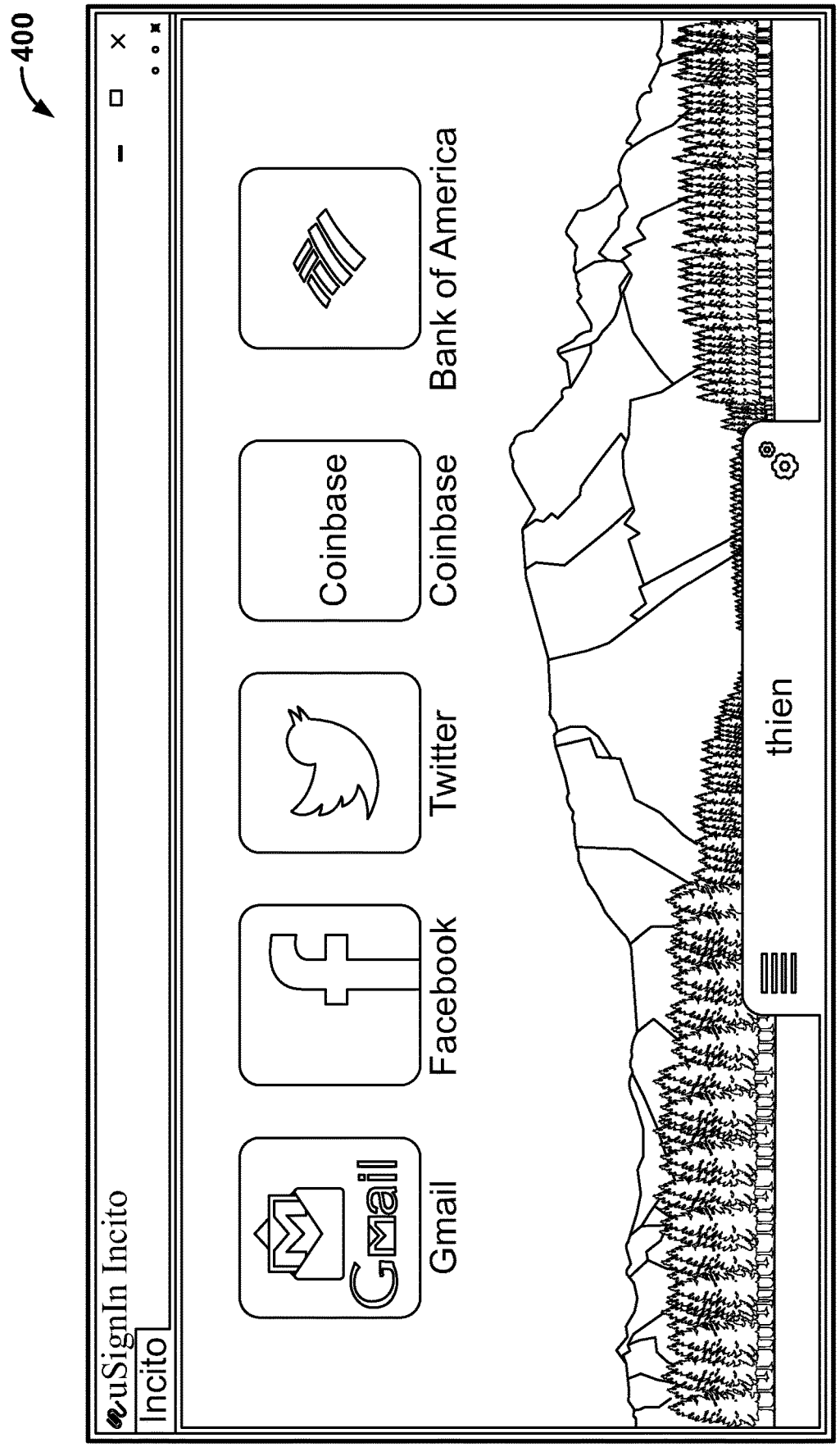
FIG. 4 shows an example of a user interface for selecting an available service or website in accordance with some embodiments of the disclosed subject matter.

Turning to FIG. 4, an example 400 of a user interface for displaying indications of available websites, apps, and/or services is shown in accordance with some embodiments of the disclosed subject matter. As illustrated in FIG. 4, user interface 400 can include indications of any suitable number (one, two, five, ten, twenty, and/or any other suitable number) of websites, apps, and/or services that require a user to log-in. For example, in some embodiments, user interface 400 can include indications of websites, apps, and/or services for accessing an email account, accessing a social networking account, accessing a banking account, and/or any other suitable services or websites. In some embodiments, each indication can include any suitable information or content, such as an icon or image associated with the website, app, and/or service, a name of the website, app, and/or service, and/or any other suitable content.

Referring back to FIG. 8, process 800 can then end at 816.

Figure 9:
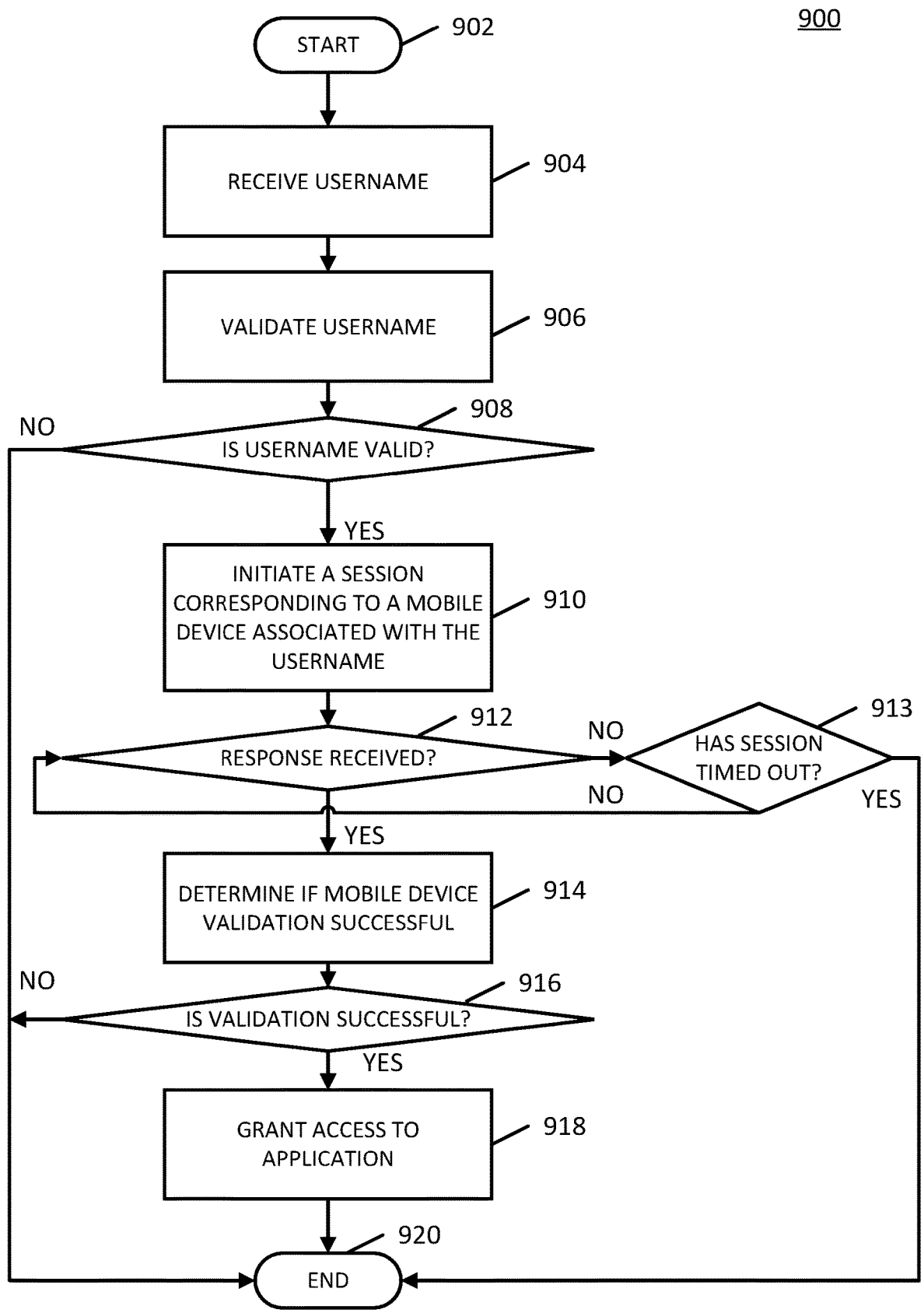
FIG. 9 shows an example of a process for signing-in to an account using a biometric signature and a mobile device in accordance with some embodiments of the disclosed subject matter.

Turning to FIG. 9, an example 900 of a process for using a mobile device to log-in to an application for accessing available websites, apps, and/or services that require user authentication is shown in accordance with some embodiments of the disclosed subject matter.

Process 900 can begin at 902 and can proceed to 904. At 904, process 900 can receive a username associated with an application for accessing available websites, apps, and/or services. In some embodiments, the username can be received in any suitable manner. For example, in some embodiments, the username can be entered via a user interface, such as user interface 100 shown in FIG. 1. In some such embodiments, user interface 100 can be presented in any suitable manner. For example, in some embodiments, user interface 100 can be presented as part of an application for accessing available websites, apps, and/or services being selected (e.g., on a mobile device, a desktop computer, and/or on any other suitable device).

At 906, process 900 can validate the username. For example, in some embodiments, process 900 can transmit a query to member database server 1302 (as shown in FIG. 13) that determines whether the username exists in a database of existing users.

Process 900 can determine whether the username is valid at 908. In some embodiments, process 900 can determine whether the username is valid based on any suitable information, such as a response from member database server 1302 that indicates whether the username exists in a database of existing users, as described above.

If, at 908, process 900 determines that the username is not valid or does not exist ("no" at 908), process 900 can end at 920.

If, at 908, process 900 determines that the username is valid and/or already exists ("yes" at 908), process 900 can proceed to 910 and can initiate a session corresponding to a mobile device associated with the username. In some embodiments, process 900 can initiate the session corresponding to a mobile device associated with the username using any suitable technique or combination of techniques. For example, in some embodiments, process 900 can identify a unique member identifier associated with the username and/or a mobile device identifier (e.g., corresponding to a mobile phone, tablet computer, and/or other mobile device associated with the username). As a more particular example, in some embodiments, process 900 can initiate the session using information stored in a communication server 1310, as shown in FIG. 13. Process 900 can then wait for a response from the mobile device, at 912 and 913.

At 912, process 900 can determine whether at response was received. If so, ("yes" at 912), process 900 can proceed to 914. Otherwise, process 900 can proceed to 913 ("no" at 912).

At 913, process 900 can determine whether a predetermined duration of time has elapsed since the session was initiated without a response from the mobile device. In some embodiments, the predetermined duration of time can be any suitable amount of time (e.g., one minute, two minutes, five minutes, and/or any other suitable duration of time).

If, at 913, process 900 determines that the predetermined duration of time has elapsed ("yes" at 913), process 900 can end at 920.

If, at 913, process 900 determines that the predetermined duration of time has not yet elapsed ("no" at 913), process 900 can proceed to 912 and can continue to wait for a response from the mobile device.

In some embodiments, the response can include any suitable information. For example, in some embodiments, the response can include a biometric signature from a user of the mobile device entered using a touchscreen and/or a stylus of the mobile device. As described above in connection with FIG. 8, in some embodiments, the biometric signature can include any suitable information, such as a fingerprint of the user, a handwritten gesture by the user, and/or any other suitable type of signature.

At 916, process 900 can validate the response from the mobile device. For example process 900 can validate a biometric signature received from the mobile device. As a more particular example, process 900 can determine whether a biometric signature received from the mobile device matches a biometric signature previously submitted by a user associated with the username, as described above in more detail in connection with FIG. 8.

If, at 916, process 900 determines that the response from the mobile device is invalid ("no" at 916), process 900 can end at 920.

If, at 916, process 900 determines that the response from the mobile device is valid ("yes" at 916) process 900 can allow the user to access an interface for accessing available websites, apps, and/or services at 918. For example, in some embodiments, process 900 can display a home page associated with the application. An example of such a user interface is shown in FIG. 4 and is described above.

Process 900 can then end at 920.

Figure 10:
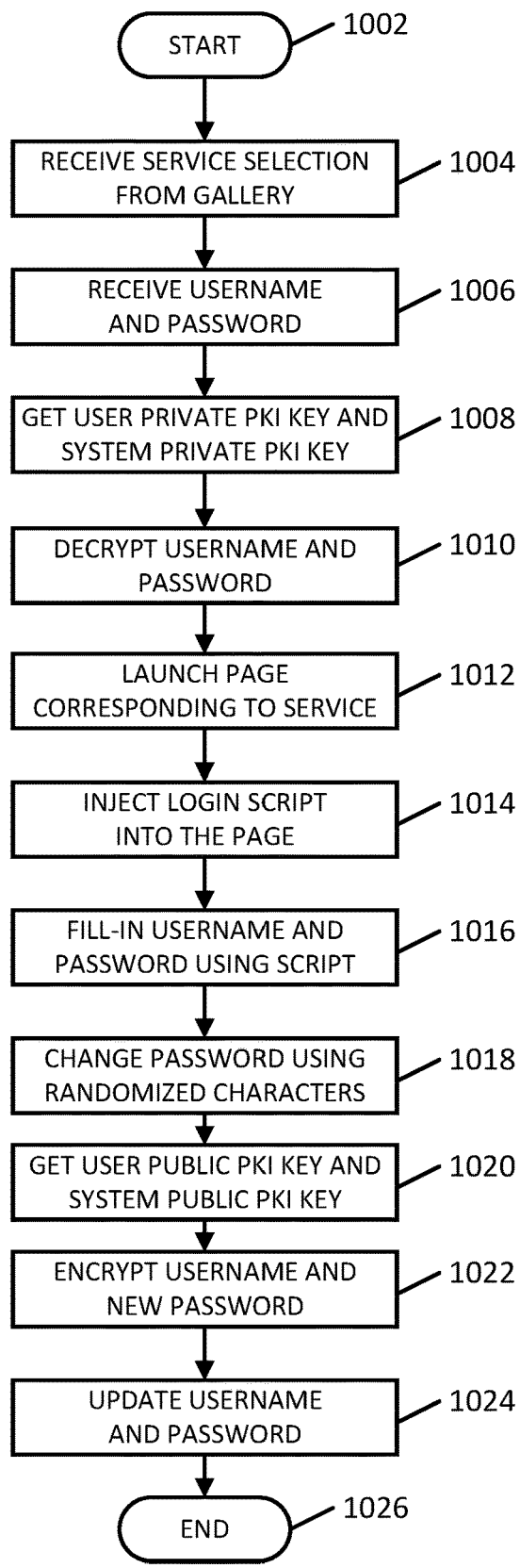
FIG. 10 shows an example of a process for automatically entering user credentials for a selected service or website in accordance with some embodiments of the disclosed subject matter.

Turning to FIG. 10, an example 1000 of a user interface for automatically logging-in to a website, app, and/or service of a group of available websites, apps, and/or services and changing a password associated with the website, app, and/or service is shown in accordance with some embodiments of the disclosed subject matter.

Process 1000 can begin at 1002 and can proceed to 1004. At 1004, process 1000 can receive a selection of a website, app, and/or service from a group of available website, apps, and/or services. For example, in some embodiments, the selection can be received via a user interface associated with an application for accessing available websites, apps, and/or services, such as user interface 400 shown in FIG. 4 (described above). In some embodiments, the selected website, app, and/or service can correspond to any suitable website, app, and/or service that requires a user to log-in to a user account to access information and/or features. For example, as described above, the website, app, and/or service can be an application or website for accessing an email account, accessing a social networking account, accessing a bank account, and/or any other suitable website, app, and/or service. In some embodiments, in response to receiving a selection of the website, app, and/or service, process 1000 can retrieve or identify an identifier corresponding to the selected website, app, and/or service.

At 1006, process 1000 can retrieve a username and/or a password corresponding to the selected website, app, and/or service. In some embodiments, the username and/or the password can be encrypted in any suitable manner. In some embodiments, process 1000 can retrieve the username and/or the password using any suitable technique or combination of techniques. For example, in some embodiments, process 1000 can retrieve the username and/or the password by transmitting a query to and/or connecting to a trusted app database server 1306, as shown in FIG. 13.

At 1008, process 1000 can retrieve a private PKI key corresponding to the username. In some embodiments, process 1000 can retrieve the private PKI key corresponding to the username using any suitable technique(s). For example, in some embodiments, process 1000 can retrieve the private PKI key from member database server 1302, as shown in FIG. 13. In some embodiments, process 1000 can additionally identify a private PKI key corresponding to the system. In some embodiments, the private PKI corresponding to the system can be identified in any suitable manner. For example, in some embodiments, the private PKI key corresponding to the system can be a global variable stored in memory of a user device executing the application that can be accessed by the application.

At 1010, process 1000 can decrypt the username and the password retrieved at 1006 using the private PKI key corresponding to the user and the private PKI key corresponding to the system. In some embodiments, any suitable PKI decryption algorithm can be used.

At 1012, process 1000 can launch the selected website, app, and/or service. In some embodiments, the selected website, app, and/or service can be launched in any suitable manner. For example, in some embodiments, the selected website, app, and/or service can be launched in a new browser tab of a browser window executing on a user device on which the website, app, and/or service was selected at 1004. In some embodiments, the website, app, and/or service can be launched by loading a URL corresponding to the selected website, app, and/or service or website. In some embodiments, the launched page can include one or more text entry boxes for entering user credentials to access a user account associated with the selected website, app, and/or service.

At 1014, process 1000 can use a script to search a page corresponding to the launched website, app, and/or service for a username textbox and/or a password text box. In some embodiments, any suitable type of script can be used (e.g., a JavaScript script, and/or any other suitable script). In some embodiments, process 1000 can wait until the page corresponding to the launched website, app, and/or service has fully loaded before using the script to search the page for the username and password text boxes.

Figure 5:
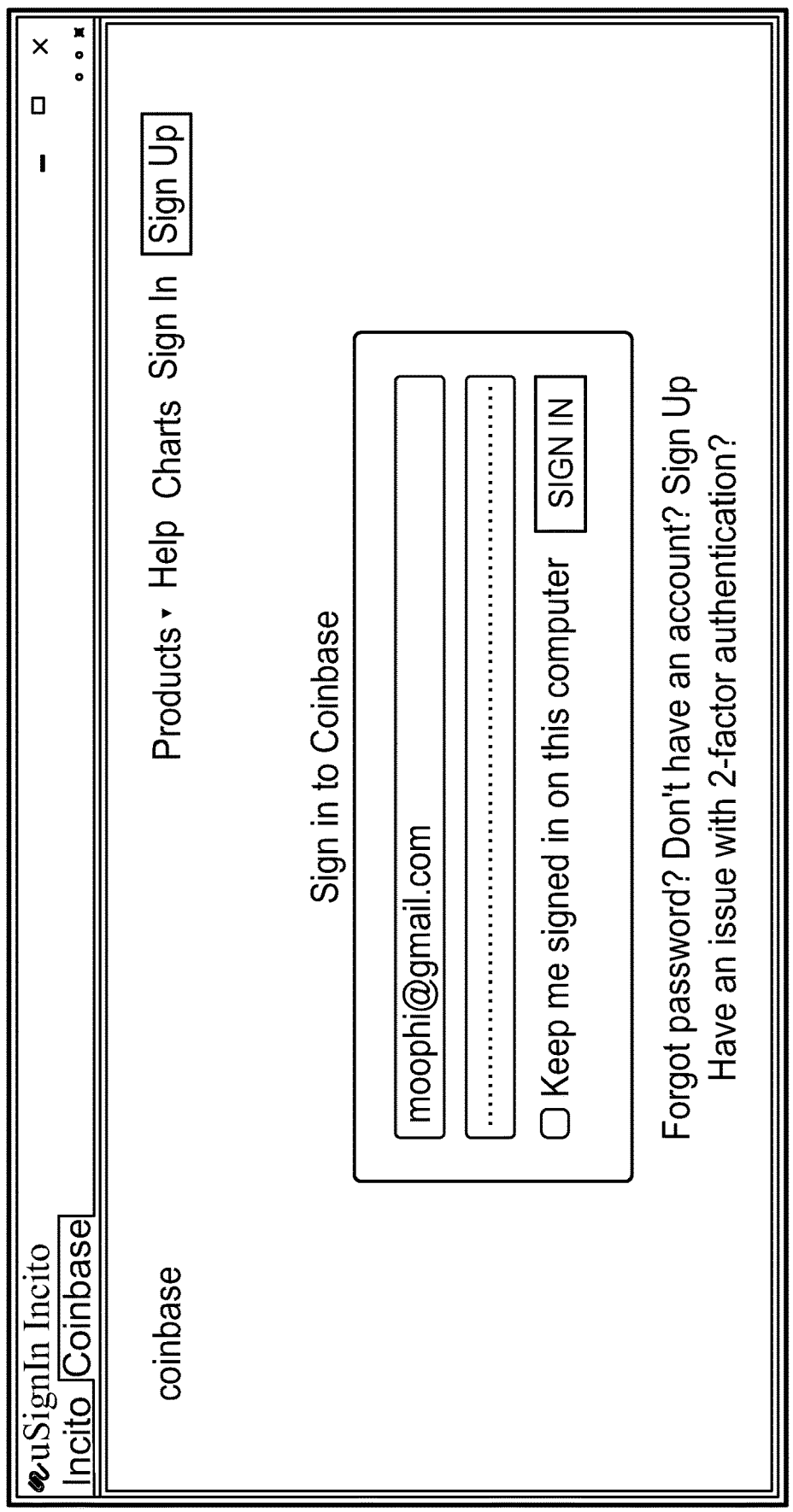
FIG. 5 shows an example of a user interface for automatically filling-in a username and a password in accordance with some embodiments of the disclosed subject matter.

At 1016, process 1000 can use the script to fill-in the identified username and password text boxes. For example, in some embodiments, process 1000 can cause the decrypted username from 1010 to be entered into a username textbox. As another example, in some embodiments, process 1000 can use the decrypted username from 1010 to be entered into a password textbox. In some embodiments, process 100 can then cause a submit button on the page corresponding to the launched service or website to be selected, for example, using the script. An example of a user interface in which the username and password have been entered is shown in user interface 500 of FIG. 5.

Figure 6:
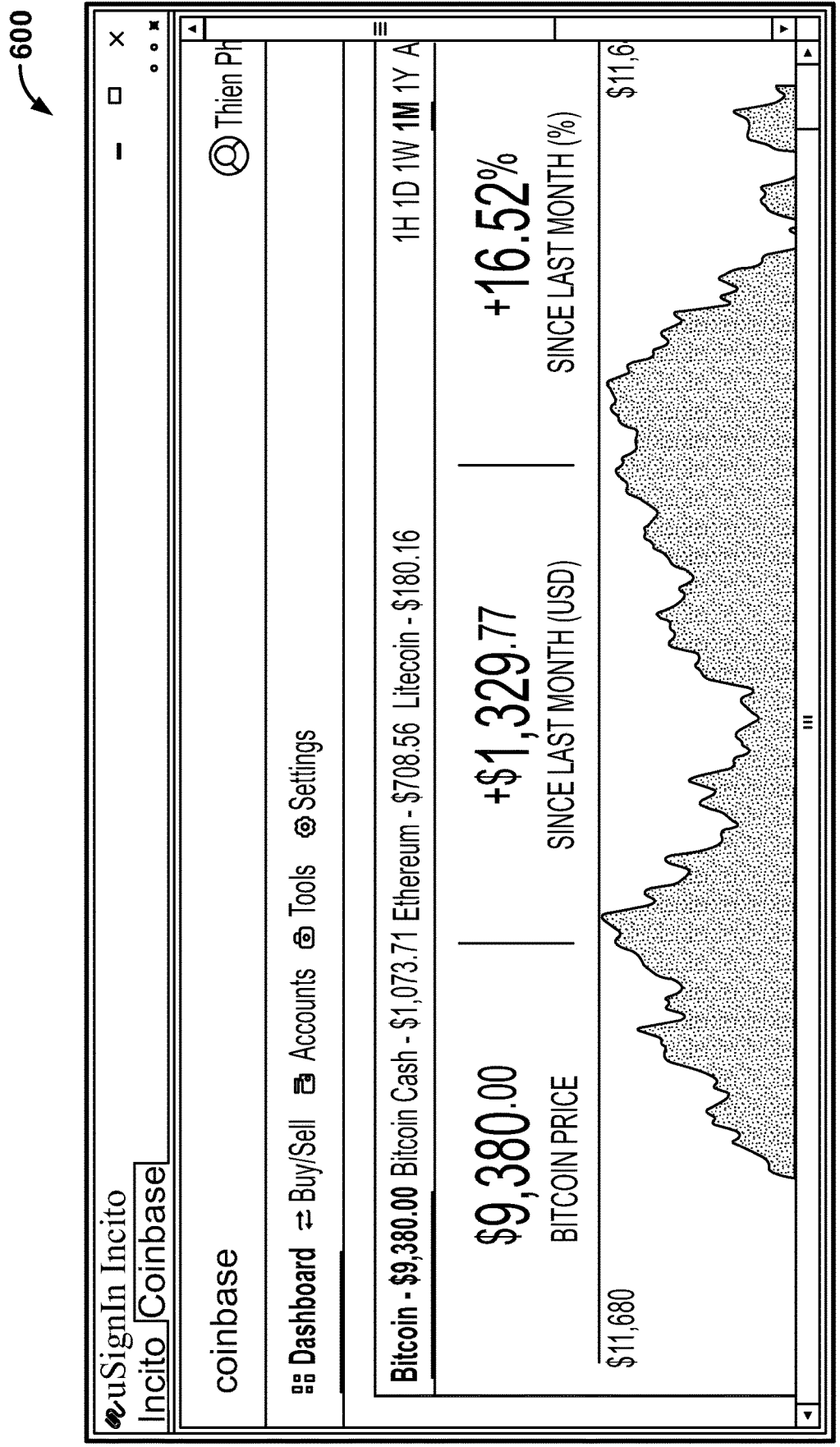
FIG. 6 shows an example of a user interface corresponding to a service that has been successfully logged-in to in accordance with some embodiments of the disclosed subject matter.
Figure 7:
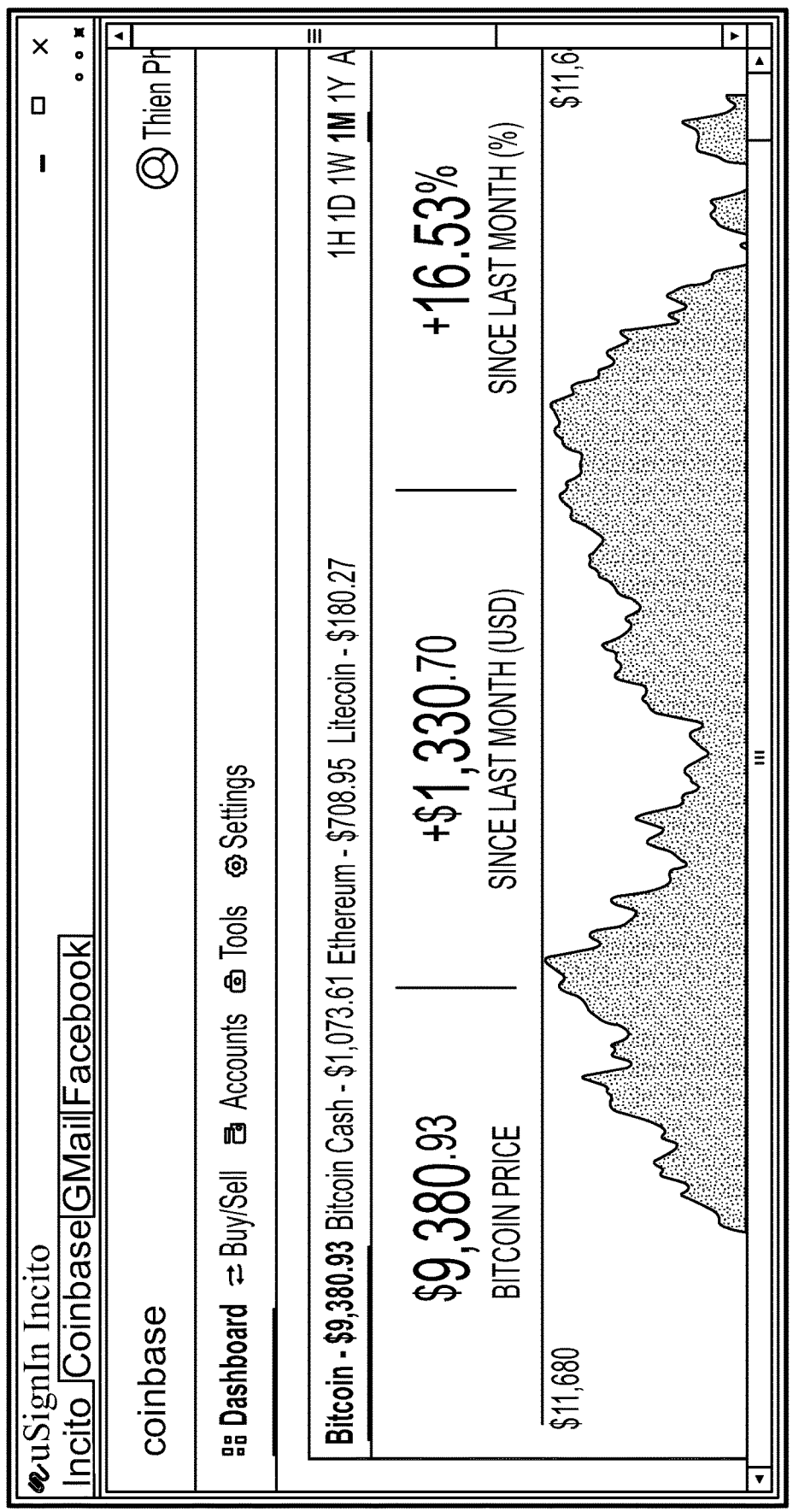
FIG. 7 shows an example of a user interface that indicates that multiple services have been logged-in to in accordance with some embodiments of the disclosed subject matter.

In some embodiments, submission of a username and password can cause a second page associated with the website, app, and/or service to be presented, for example, as shown in user interface 600 of FIG. 6. For example, in an instance where the website, app, and/or service is a website, app, and/or service for accessing email, the second page can include an inbox corresponding to the submitted username. As another example, in an instance where the website, app, and/or service is a website, app, and/or service for accessing a bank account, the second page can include an accounts summary page, and/or any other suitable information. In some embodiments, in an instance where multiple websites, apps, and/or services have been launched using the techniques described above in connection with process 1000, a page corresponding to each website, app, and/or service can be launched in a new tab of a browser window, as shown in user interface 700 of FIG. 7.

At 1018, process 1000 can change the password associated with the selected website, app, and/or service using random characters. For example, in some embodiments process 1000 can generate a password that includes any suitable number (e.g., five, ten, and/or any other suitable number) of randomly selected alphanumeric and/or other characters (e.g., punctuation symbols, and/or any other suitable characters). In some embodiments, process 1000 can wait until the username and password submitted at 1016 have been verified and a subsequent page (e.g., the second page described above in connection with 1016) has fully loaded before generating a randomized password.

Note that, in some embodiments, process 1000 can determine that a new password is to be generated in response to any suitable criteria. For example, in some embodiments, process 1000 can determine that more than a predetermined duration of time (e.g., more than one month, more than six months, and/or any other suitable duration of time) has elapsed since a previous time a password associated with the selected website, app, and/or service has been changed. As another example, in some embodiments, process 1000 can determine that a new password is to be generated in response to receiving an explicit indication from a user of the user device that the password is to be changed (e.g., via a selection of a "change password" button in a user interface, and/or in any other suitable manner).

In some embodiments, process 1000 can then use a password change script (e.g., a JavaScript script, and/or any other suitable type of script) to change a password associated with the username to the randomized password generated (as described above). For example, in some embodiments, the script can cause a "change password" option to be selected from a security menu or from a settings panel.

At 1020, process 1000 can retrieve a public PKI key corresponding to a user associated with the username. For example, in some embodiments, process 1000 can identify a user identifier corresponding to a current application session, and can then identify the public PKI key associated with the user identifier. In some embodiments, process 1000 can retrieve the public PKI key using member database server 1302, as shown in FIG. 13. Additionally, in some embodiments, process 1000 can identify a public PKI key corresponding to the system. In some embodiments, the public PKI key corresponding to the system can be stored in memory of the user device executing the application (e.g., as a global variable, and/or in any other suitable manner), and can be accessed by the application.

At 1022, process 1000 can encrypt the decrypted username of 1010 and can encrypt the password generated at 1018. In some embodiments, process 1000 can encrypt the username and the password using the public PKI key corresponding to the user, the public PKI key corresponding to the system, and any suitable PKI encryption algorithm.

At 1024, process 1000 can update the username and password stored in association with a user identifier and the selected service or website for future use. For example, in some embodiments, process 1000 can cause the encrypted username and the encrypted password to be stored in association with an application identifier associated with the selected application and the user identifier on trusted app database server 1306.

Process 1000 can then end at 1026.

Figure 11:
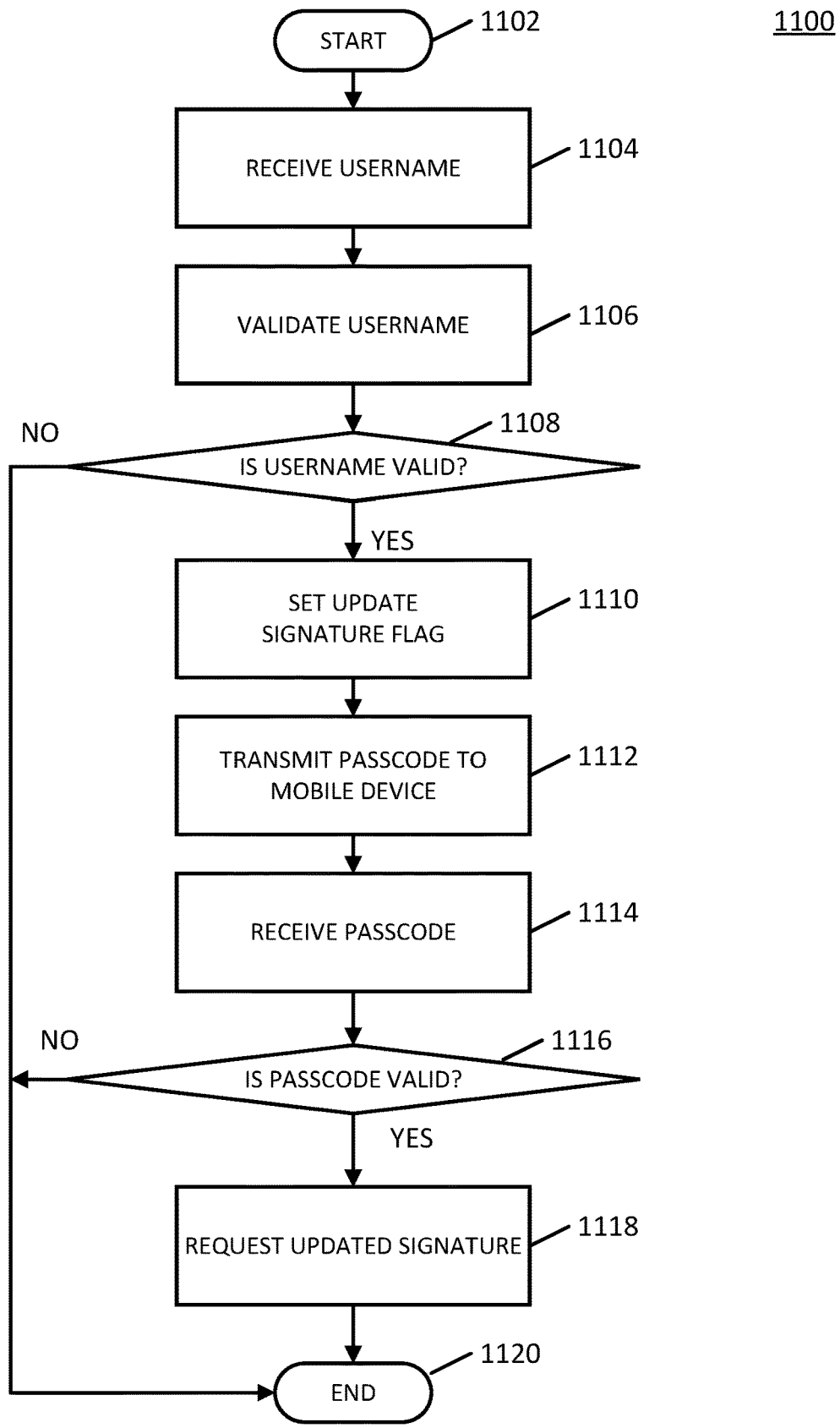
FIG. 11 shows an example of a process for resetting or confirming a biometric signature in accordance with some embodiments of the disclosed subject matter.

Turning to FIG. 11, an example 1100 of a process for updating a biometric signature used for user validation in accordance with some embodiments of the disclosed subject matter. In some embodiments, process 1100 can be executed at any suitable frequency (e.g., once per month, once per year, and/or at any other suitable frequency) to maintain an updated version of a user signature that is used to log-in to an application for accessing services or websites, as described above in connection with FIGS. 8 and 9.

Figure 2:
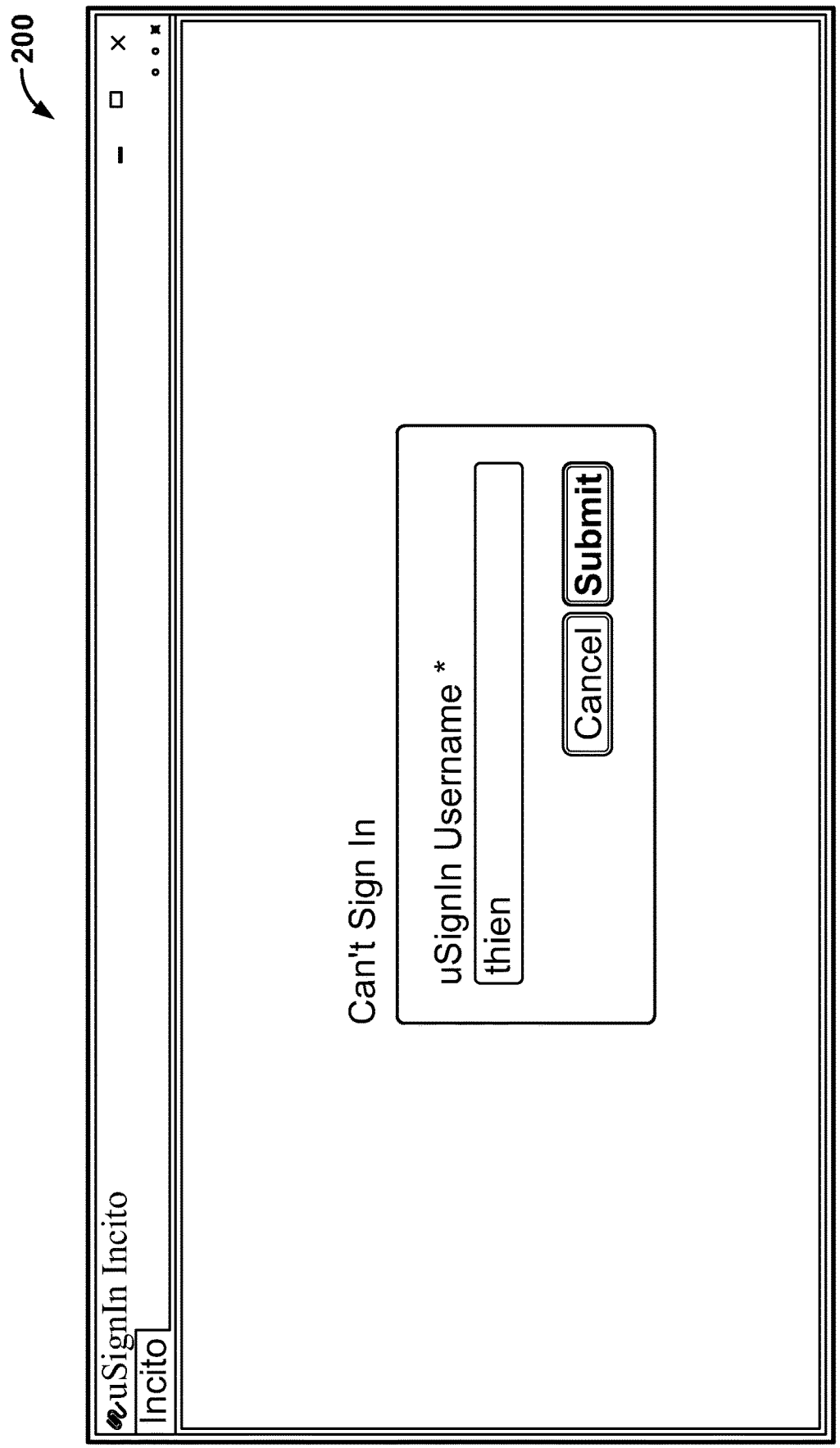
FIGS. 2 and 3 show examples of user interfaces for resetting biometric signatures in accordance with some embodiments of the disclosed subject matter.

Process 1100 can begin at 1102 and can proceed to 1104. At 1104, process 1100 can receive a username of a user. In some embodiments, process 1100 can receive the username in any suitable manner. For example, in some embodiments, process 1100 can receive the username via a user interface presented on a user device, as shown in user interface 200 of FIG. 2.

At 1106, process 1100 can validate the username. For example, in some embodiments, process 1100 can validate the username by transmitting a query to member database server 1302, as shown in FIG. 13.

At 1108, process 1100 can determine whether the username is valid based on any suitable information. For example, in some embodiments, process 1100 can determine that the username is valid based on a response from member database server 1302 that indicates that the username exists in a database stored on member database server 1302. As another example, in some embodiments, process 1100 can determine that the username is invalid based on a response from member database server 1302 that indicates that the username does not exist in a database stored on member database server 1302.

If, at 1108, process 1100 determines that the username is not valid ("no" at 1108), process 1100 can end at 1120.

If, at 1108, process 1100 determines that the username is valid ("yes" at 1108), process 1100 can proceed to 1110 and can determine a unique identifier corresponding to the username and can set any suitable indicator that a biometric signature associated with the username and/or the unique identifier is to be updated and/or verified. Note that, in some embodiments, the indicator can be set based on any other suitable criteria, such as that more than a predetermined amount of time has elapsed since a previous update or verification of the biometric signature (e.g., more than a month, more than a year, and/or any other suitable duration of time).

At 1112, process 1100 can identify a mobile phone number associated with the username and/or the unique identifier associated with the username (e.g., a mobile phone number stored on member database server 1302, and/or stored in any other suitable device), and can transmit a passcode to the mobile phone using the mobile phone number. In some embodiments, process 1100 can generate a passcode of any suitable number of randomly generated alphanumeric characters and/or other characters prior to transmitting the passcode to the mobile phone.

Figure 3:
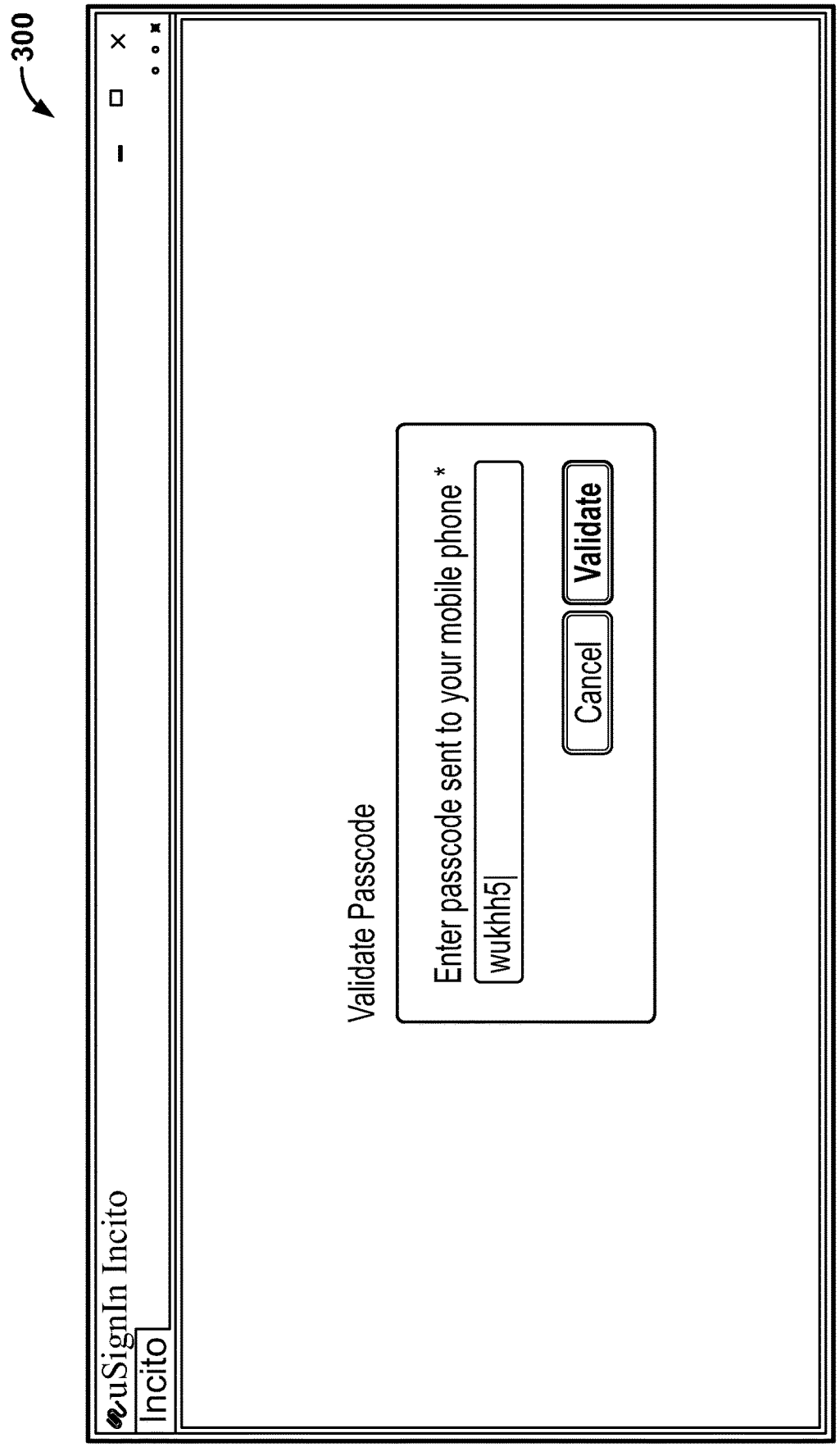

At 1114, process 1100 can receive a passcode via a user interface presented on the user device (e.g., the user device that received the username at 1104). An example of a user interface for entering a passcode is shown in user interface 300 of FIG. 3.

At 1116, process 1100 can determine whether the passcode received at 1114 matches the passcode transmitted to the mobile phone at 1112.

If, at 1116, process 1100 determines that the passcode received at 1114 does not match the passcode transmitted to the mobile phone at 1112 ("no" at 1116), process 1100 can end at 1120.

If, at 1116, process 1100 determines that the passcode received at 1114 matches the passcode transmitted to the mobile phone at 1112 ("yes" at 1116), process 1100 can proceed to 1118 and can request that a user of the user device submit an updated signature. In some embodiments, the updated signature can be received in any suitable manner, such as via a touchscreen of the user device. As described above in connection with FIGS. 8 and 9, the signature can include any suitable information, such as a fingerprint of the user, a handwritten gesture by the user, and/or any other suitable type of signature. In some embodiments, process 1100 can update a biometric signature associated with the username and/or the unique user identifier to the received signature. Additionally or alternatively, in some embodiments, process 1100 can compare the received signature to a previously submitted signature to verify the identity of the user.

Process 1100 can then end at 1120.

Figure 12:
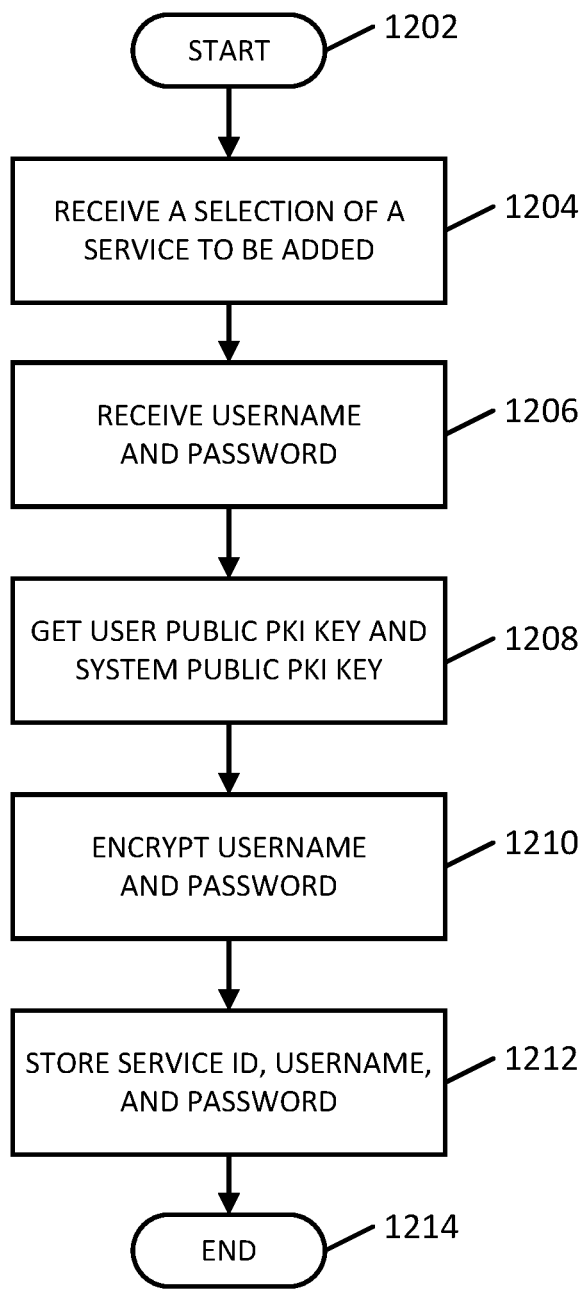
FIG. 12 shows an example of a process for adding a new service or a website to a group of available services and/or websites in accordance with some embodiments of the disclosed subject matter.

Turning to FIG. 12, an example 1200 of a process for adding a website, app, and/or service to a group of available websites, apps, and/or services is shown in accordance with some embodiments of the disclosed subject matter.

Process 1200 can begin at 1202 and can proceed to 1204. At 1204, process 1200 can receive a selection of a website, app, and/or service to be added to the group of available websites, apps, and/or services. In some embodiments, the selection of the website, app, and/or service can be received in any suitable manner. For example, in some embodiments, the selection can be received from a selection of a website, app, and/or service from a listing of websites, apps, and/or services supported by an application for accessing websites, apps, and/or services. In some embodiments, the selection can be received via a user interface presented as part of an application for accessing websites, apps, and/or services.

At 1206, process 1200 can receive a username and a password corresponding to a user account associated with the selected website, app, and/or service. For example, in some embodiments, the username and password can correspond to user credentials to access an existing account associated with the selected website, app, and/or service. In some embodiments, the username and the password can be received in any suitable manner, for example, via a user interface presented on a user device used to select the website, app, and/or service at 1204.

At 1208, process 1200 can retrieve a public PKI key associated with the user. In some embodiments, process 1200 can identify a unique user identifier associated with the user and can retrieve the public PKI key using the user identifier, for example, from member database server 1302. In some embodiments, process 1200 can additionally identify a public PKI key corresponding to the system. For example, in some embodiments, the public PKI key corresponding to the system can be stored in memory of the user device (e.g., as a global variable, and/or in any other suitable manner) and can be accessed by the application for accessing services or websites.

At 1210, process 1200 can encrypt the username and the password. In some embodiments, process 1200 can encrypt the username and the password using the public PKI key corresponding to the user, the public PKI key corresponding to the system, and any suitable PKI encryption algorithm.

At 1212, process 1200 can store the encrypted username and the encrypted password in connection with an identifier of the selected website, app, and/or service. For example, in some embodiments, process 1200 can store the encrypted username and the encrypted password on trusted app database server 1306, as shown in FIG. 13.

Process 1200 can then end at 1214.

Turning to FIG. 13, an example 1300 of hardware for managing user credentials that can be used in accordance with some embodiments of the disclosed subject matter is shown. As illustrated, hardware 1300 can include a member database server 1302, a biometric signature server 1304, a trusted app database server 1306, a personal app server 1308, a communication server 1310, an app web server 1312, a communication network 1314, and one or more user devices 1316, such as user devices 1318 and 1320.

In some embodiments, functions performed by each of servers 1302-1312 are described above in connection with FIGS. 8-12.

Communication network 1314 can be any suitable combination of one or more wired and/or wireless networks in some embodiments. For example, communication network 1314 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 1316 can be connected by one or more communications links to communication network 1314 that can be linked via one or more communications links to any of servers 1302-1312. The communications links can be any communications links suitable for communicating data among user devices 1316 and server 1302-1312, such as network links, dial-up links, wireless links, hard-wired links, any other suitable communications links, or any suitable combination of such links. In some embodiments, connection to communication network 1314 can be through any suitable device, such as a network router.

User devices 1316 can include any one or more user devices (such as user device 1318 and/or 1320) suitable for accessing and using any websites, apps, and/or services. For example, in some embodiments, user devices 1316 can include a mobile device, such as a mobile phone, a tablet computer, a wearable computer, a laptop computer, a vehicle (e.g., a car, a boat, an airplane, or any other suitable vehicle) information and/or entertainment system, and/or any other suitable mobile device. As another example, in some embodiments, user devices 1316 can include a non-mobile device, such as a television, a projector device, a game console, desktop computer, and/or any other suitable non-mobile device.

Although servers 1302-1312 are illustrated as multiple devices, the functions performed by servers 1302-1312 can be performed using any suitable number of devices (including only one) in some embodiments. For example, in some embodiments, one, two, three, or more devices can be used to implement the functions performed by servers 1302-1312.

Although two user devices 1318 and 1320 are shown in FIG. 13 to avoid over-complicating the figure, any suitable number of user devices (including only one), and/or any suitable types of user devices, can be used in some embodiments.

Figure 14:
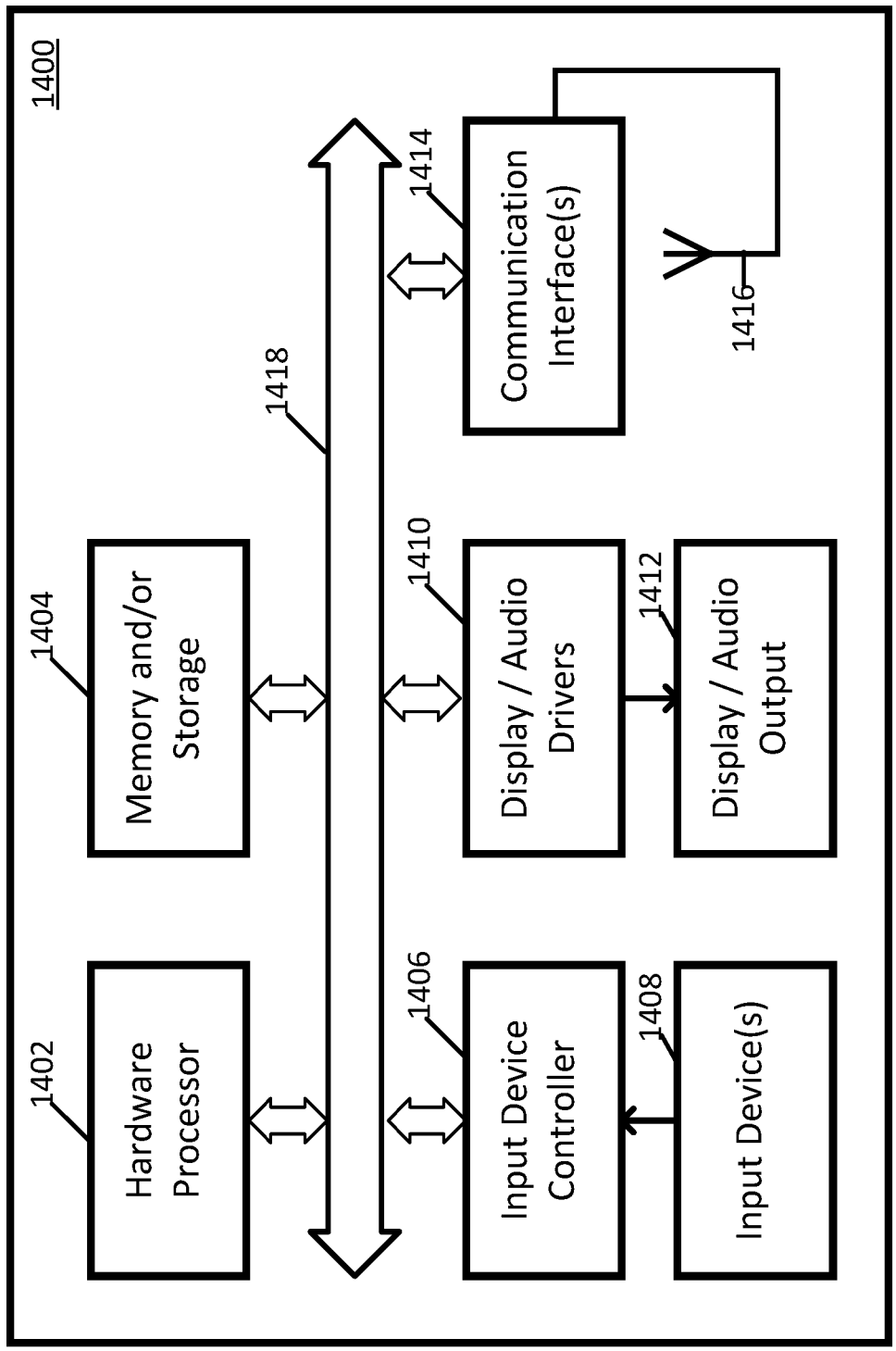
FIG. 14 shows a detailed example of hardware that can be used in a server and/or a user device of FIG. 13 in accordance with some embodiments of the disclosed subject matter.

Servers 1302-1312 and user devices 1316 can be implemented using any suitable hardware in some embodiments. For example, in some embodiments, servers 1302-1312 and user devices 1316 can be implemented using any suitable general purpose computer or special purpose computer. For example, a mobile phone may be implemented using a special purpose computer. Any such general purpose computer or special purpose computer can include any suitable hardware. For example, as illustrated in example hardware 1400 of FIG. 14, such hardware can include hardware processor 1402, memory and/or storage 1404, an input device controller 1406, an input device 1408, display/audio drivers 1410, display and audio output circuitry 1412, communication interface(s) 1414, an antenna 1416, and a bus 1418.

Hardware processor 1402 can include any suitable hardware processor, such as a microprocessor, a micro-controller, digital signal processor(s), dedicated logic, and/or any other suitable circuitry for controlling the functioning of a general-purpose computer or a special purpose computer in some embodiments. In some embodiments, hardware processor 1402 can be controlled by a computer program stored in memory and/or storage 1404 of a user device 1316. For example, in some embodiments, the computer program can cause hardware processor 1402 to request a username or signature to log-in to an application executing on user device 1316, present indications of available websites, apps, and/or services, cause a username and password to be automatically entered to log-in to a selected website, app, and/or service and/or perform any other suitable functions. In some embodiments, hardware processor 1402 can be controlled by a server program stored in memory and/or storage 1404 any of servers 1302-1312. For example, in some embodiments, the server program can cause hardware processor 1402 to verify a biometric signature of a user, verify a username of a user, store credentials associated with different user accounts, and/or perform any other suitable functions.

Memory and/or storage 1404 can be any suitable memory and/or storage for storing programs, data, media content, and/or any other suitable information in some embodiments. For example, memory and/or storage 1404 can include random access memory, read-only memory, flash memory, hard disk storage, optical media, and/or any other suitable memory.

Input device controller 1406 can be any suitable circuitry for controlling and receiving input from one or more input devices 1408 in some embodiments. For example, input device controller 1406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 1410 can be any suitable circuitry for controlling and driving output to one or more display/audio output devices 1412 in some embodiments. For example, display/audio drivers 1410 can be circuitry for driving a touchscreen, a flat-panel display, a cathode ray tube display, a projector, a speaker or speakers, and/or any other suitable display and/or presentation devices.

Communication interface(s) 1414 can be any suitable circuitry for interfacing with one or more communication networks, such as network 1314 as shown in FIG. 13. For example, interface(s) 1414 can include network interface card circuitry, wireless communication circuitry, and/or any other suitable type of communication network circuitry.

Antenna 1416 can be any suitable one or more antennas for wirelessly communicating with a communication network (e.g., communication network 1314) in some embodiments. In some embodiments, antenna 1416 can be omitted.

Bus 1418 can be any suitable mechanism for communicating between two or more components 1402, 1404, 1406, 1410, and 1414 in some embodiments.

Any other suitable components can be included in hardware 1400 in accordance with some embodiments.

In some embodiments, at least some of the above described blocks of the processes of FIGS. 8-12 can be executed or performed in any order or sequence not limited to the order and sequence shown in and described in connection with the figures. Also, some of the above blocks of FIGS. 8-12 can be executed or performed substantially simultaneously where appropriate or in parallel to reduce latency and processing times. Additionally or alternatively, some of the above described blocks of the processes of FIGS. 8-12 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for managing user credentials are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for managing user credentials, comprising:
   a memory; and
   at least one hardware processor that is coupled to the memory and that is configured to:
   receive: a first username corresponding to a first user account of an application for managing user credentials; and a biometric signature of a user;
   in response to determining that the biometric signature of the user matches a stored signature corresponding to the first user account, cause indications of a group of available services to be presented;
   receive a selection of a service of the group of available services as a selected service;
   transmit, to a server, an identifier corresponding to the selected service;
   receive, from the server, an encrypted username and an encrypted password corresponding to a second user account of the selected service;
   as part of a single process, decrypt the encrypted username and the encrypted password, resulting in a decrypted username and a decrypted password, wherein decrypting the encrypted username and the encrypted password comprises retrieving a private PKI key associated with the first user account from a hardware server separate from the hardware processor and a private PKI key associated with the application from the memory and decrypting the encrypted username and the encrypted password using the private PKI key associated with the first user account and the private PKI key associated with the application;
   cause a first page to be opened that corresponds to a login page of the selected service;
   cause a script to be launched, wherein the script identifies a username entry field and a password entry field on the login page;
   cause, using the script, the decrypted username to be entered in the username entry field and the decrypted password to be entered in the password entry field;
   cause, using the script, a submit button within the login page to be selected, wherein causing the submit button to be selected causes the second user account to be authenticated using the decrypted username and the decrypted password;
   wait for the second user account to be authenticated using the decrypted username and the decrypted password and for a subsequent page to be loaded; and
   in response to the second user account being authenticated using the decrypted username and the decrypted password and to the subsequent page being loaded:
     generate an updated password by generating a plurality of random characters;
     encrypt the updated password;
     cause, using the script, a password associated with the second user account to be changed to the updated password; and
     transmit the encrypted password in connection with the identifier corresponding to the selected service to the server.

2. The system of claim 1, wherein encrypting the updated password comprises retrieving a public PKI key associated with the first user account and a public PKI key associated with the application, wherein the updated password is encrypted using the public PKI key associated with the first user account and the public PKI key associated with the application.

3. The system of claim 1, wherein the biometric signature is received via a touchscreen.

4. The system of claim 1, wherein the at least one hardware processor is further configured to:
receive, via a user interface presented in connection with the application, a selection of a new service to be included in the group of available services;
receive a username and a password corresponding to a third user account of the new service;
encrypt the username and the password;
transmit the encrypted username and the encrypted password to the server in connection with an identifier of the new service; and
update the group of available services to include the new service.

5. A method for managing user credentials, comprising:
receiving, at a user device, a first username corresponding to a first user account of an application for managing user credentials and a biometric signature of a user of the user device;
in response to determining that the biometric signature of the user matches a stored signature corresponding to the first user account, causing indications of a group of available services to be presented on the user device;
receiving, at the user device, a selection of a service of the group of available services as a selected service;
transmitting, to a server, an identifier corresponding to the selected service;
receiving, from the server, an encrypted username and an encrypted password corresponding to a second user account of the selected service;
as part of a single process, decrypting the encrypted username and the encrypted password, resulting in a decrypted username and a decrypted password, wherein decrypting the encrypted username and the encrypted password comprises retrieving a private PKI key associated with the first user account from a hardware server separate from the user device and a private PKI key associated with the application from a memory of the user device and decrypting the encrypted username and the encrypted password using the private PKI key associated with the first user account and the private PKI key associated with the application;
causing, on the user device, a first page to be opened that corresponds to a login page of the selected service;
causing, at the user device, a script to be launched, wherein the script identifies a username entry field and a password entry field on the login page;
causing, at the user device by the script, the decrypted username to be entered in the username entry field and the decrypted password to be entered in the password entry field;
causing, using the script, a submit button within the login page to be selected, wherein causing the submit button to be selected causes the second user account to be authenticated using the decrypted username and the decrypted password;
waiting for the second user account to be authenticated using the decrypted username and the decrypted password and for a subsequent page to be loaded; and
in response to the second user account being authenticated using the decrypted username and the decrypted password and to the subsequent page being loaded:
generating an updated password by generating a plurality of random characters;
encrypting the updated password;
causing, using the script, a password associated with the second user account to be changed to the updated password; and
transmitting the encrypted password in connection with the identifier corresponding to the selected service to the server.

6. The method of claim 5, wherein encrypting the updated password comprises retrieving a public PKI key associated with the first user account and a public PKI key associated with the application, wherein the updated password is encrypted using the public PKI key associated with the first user account and the public PKI key associated with the application.

7. The method of claim 5, wherein the biometric signature is received via a touchscreen associated with the user device.

8. The method of claim 5, further comprising:
receiving, via a user interface presented in connection with the application, a selection of a new service to be included in the group of available services;
receiving a username and a password corresponding to a third user account of the new service;
encrypting the username and the password;
transmitting the encrypted username and the encrypted password to the server in connection with an identifier of the new service; and
updating the group of available services to include the new service.

9. A non-transitory computer-readable medium containing computer executable instructions that, when executed by a processor, cause the processor to perform a method for managing user credentials, the method comprising:
receiving, at a user device, a first username corresponding to a first user account of an application for managing user credentials and a biometric signature of a user of the user device;
in response to determining that the biometric signature of the user matches a stored signature corresponding to the first user account, causing indications of a group of available services to be presented on the user device;
receiving, at the user device, a selection of a service of the group of available services as a selected service;
transmitting, to a server, an identifier corresponding to the selected service;
receiving, from the server, an encrypted username and an encrypted password corresponding to a second user account of the selected service;
as part of a single process, decrypting the encrypted username and the encrypted password, resulting in a decrypted username and a decrypted password, wherein decrypting the encrypted username and the encrypted password comprises retrieving a private PKI key associated with the first user account from a hardware server separate from the user device and a private PKI key associated with the application from a memory of the user device and decrypting the encrypted username and the encrypted password using the private PKI key associated with the first user account and the private PKI key associated with the application;

causing, on the user device, a first page to be opened that corresponds to a login page of the selected service;

causing, at the user device, a script to be launched, wherein the script identifies a username entry field and a password entry field on the login page;

causing, at the user device by the script, the decrypted username to be entered in the username entry field and the decrypted password to be entered in the password entry field;

causing, using the script, a submit button within the login page to be selected, wherein causing the submit button to be selected causes the second user account to be authenticated using the decrypted username and the decrypted password;

waiting for the second user account to be authenticated using the decrypted username and the decrypted password and for a subsequent page to be loaded; and in response to the second user account being authenticated using the decrypted username and the decrypted password and to the subsequent page being loaded:
generating an updated password by generating a plurality of random characters;
encrypting the updated password;
causing, using the script, a password associated with the second user account to be changed to the updated password; and
transmitting the encrypted password in connection with the identifier corresponding to the selected service to the server.

10. The non-transitory computer-readable medium of claim 9, wherein encrypting the updated password comprises retrieving a public PKI key associated with the first user account and a public PKI key associated with the application, wherein the updated password is encrypted using the public PKI key associated with the first user account and the public PKI key associated with the application.

11. The non-transitory computer-readable medium of claim 9, wherein the biometric signature is received via a touchscreen associated with the user device.

12. The non-transitory computer-readable medium of claim 9, wherein the method further comprises:
receiving, via a user interface presented in connection with the application, a selection of a new service to be included in the group of available services;
receiving a username and a password corresponding to a third user account of the new service;
encrypting the username and the password;
transmitting the encrypted username and the encrypted password to the server in connection with an identifier of the new service; and
updating the group of available services to include the new service.

* * * * *